(12) United States Patent
Tanyildiz

(10) Patent No.: US 11,331,604 B2
(45) Date of Patent: May 17, 2022

(54) AIR PURIFIER WITH FILTER UNIT

(71) Applicant: Electrolux Appliances Aktiebolag, Stockholm (SE)

(72) Inventor: Baris Tanyildiz, Zhejiang (CN)

(73) Assignee: Electrolux Appliances Aktiebolag

( * ) Notice: Subject to any disclaimer, the term of this patent is extended or adjusted under 35 U.S.C. 154(b) by 0 days.

(21) Appl. No.: 17/052,946

(22) PCT Filed: May 16, 2018

(86) PCT No.: PCT/EP2018/062762
§ 371 (c)(1),
(2) Date: Nov. 4, 2020

(87) PCT Pub. No.: WO2019/219188
PCT Pub. Date: Nov. 21, 2019

(65) Prior Publication Data
US 2021/0231323 A1    Jul. 29, 2021

(51) Int. Cl.
*B01D 46/00* (2022.01)
*B01D 29/64* (2006.01)
(Continued)

(52) U.S. Cl.
CPC ......... *B01D 29/62* (2013.01); *B01D 29/6407* (2013.01); *B01D 29/6469* (2013.01);
(Continued)

(58) Field of Classification Search
CPC ............ B01D 46/0057; B01D 46/0054; B01D 46/0065; B01D 46/0028; B01D 29/6407; B01D 29/6469; B01D 29/62
See application file for complete search history.

(56) References Cited

U.S. PATENT DOCUMENTS

| | | |
|---|---|---|
| 5,330,722 A | 7/1994 | Pick et al. |
| 2003/0182906 A1 | 10/2003 | Chullanandana et al. |

(Continued)

FOREIGN PATENT DOCUMENTS

| | | |
|---|---|---|
| CN | 1526998 A | 9/2004 |
| CN | 2909063 Y | 6/2007 |

(Continued)

OTHER PUBLICATIONS

International Search Report and Written Opinion for International Application No. PCT/EP2018/062760, dated Feb. 12, 2019, 8 pages.

(Continued)

*Primary Examiner* — Robert A Hopkins
(74) *Attorney, Agent, or Firm* — RatnerPrestia

(57) ABSTRACT

An air purifier and a filter cleaner are provided. The filter cleaner is configured to be mounted in an air purifier. The filter cleaner comprises a motor, a cleaning member and a gear mechanism. The motor is configured to drive the gear mechanism to drive a radially outwards facing surface of a cylindrical air filter or a filter holding case past the cleaning member. The air purifier can comprise a polygonal casing and the cylindrical air filter can be located inside the polygonal casing so that a space is formed between the radially outwards facing surface of the cylindrical air filter and the inside corners of the polygonal casing. The filter cleaner can be located in the space between the corner and the filter.

15 Claims, 3 Drawing Sheets

(51) Int. Cl.
   *B01D 29/62* (2006.01)
   *F24F 8/22* (2021.01)
   *F24F 3/16* (2021.01)
   *B01D 46/681* (2022.01)

(52) U.S. Cl.
   CPC ....... *B01D 46/0028* (2013.01); *B01D 46/681* (2022.01); *F24F 3/16* (2013.01); *F24F 8/22* (2021.01)

(56) References Cited

U.S. PATENT DOCUMENTS

| | | | |
|---|---|---|---|
| 2006/0096459 | A1 | 5/2006 | Iwano et al. |
| 2008/0050288 | A1 | 2/2008 | Okamoto et al. |
| 2008/0295271 | A1 | 12/2008 | Perunicic |
| 2009/0205498 | A1 | 8/2009 | Wang et al. |
| 2010/0095844 | A1* | 4/2010 | Gilleland .......... B01D 46/0036 95/148 |

FOREIGN PATENT DOCUMENTS

| | | |
|---|---|---|
| CN | 101026987 A | 8/2007 |
| CN | 201285141 Y | 8/2009 |
| CN | 204619553 U | 9/2015 |
| CN | 204786821 U | 11/2015 |
| CN | 105879516 A * | 8/2016 ............ B01D 46/24 |
| CN | 107803078 A | 3/2018 |
| DE | 102016116837 A1 | 3/2018 |
| JP | 48108268 U | 12/1973 |
| JP | 63175613 A | 7/1988 |
| JP | 2006153289 A | 6/2006 |
| JP | 2009236399 A | 10/2009 |
| JP | 5799263 B1 | 10/2015 |
| JP | 2015197224 A | 11/2015 |
| NL | 80564 C | 9/1955 |
| WO | 9529749 A1 | 11/1995 |

OTHER PUBLICATIONS

International Search Report and Written Opinion for International Application No. PCT/EP2018/062762, dated Apr. 5, 2019, 15 pages.
Chinese Office Action for Chinese Application No. 201880093271.2, dated Dec. 16, 2021, with translation, 17 pages.
Chinese Office Action for Chinese Application No. 201880093451.0, dated Dec. 22, 2021, with translation, 13 pages.

* cited by examiner

AIR PURIFIER WITH FILTER UNIT

This application is a U.S. National Phase application of PCT International Application No. PCT/EP2018/062762, filed May 16, 2018, which is incorporated by reference herein.

TECHNICAL FIELD

The invention relates to an air purifier. The present invention also relates to a filter cleaner for an air purifier.

BACKGROUND

Air purifiers are used to clean air from undesired particles such as pollen, germs, virus, allergens, micro particles, dust etc. Typically, the air purification is performed by letting air flow through an air-filter.

Different types of air-purifiers exist. For example, so-called tower air purifiers can be used. In a tower air purifier, air can be passed from the sides of the tower air purifier, made to pass a filter and let out in the top of the tower air purifier. Other types of air purifiers exist.

The filter in the air purifier needs to be changed or cleaned from time to time to be efficient. Different methods for and devices for cleaning the filter of an air purifier are used. For tower air-purifiers, the filter is typically exchanged when the filter is no longer efficient.

There is a constant desire to improve air purifier. Hence, there exists a need for an improved air purifier.

SUMMARY

It is an object of the present invention to provide an improved air purifier. In particular, it is an object to improve the filtering and the filter cleaning in an air purifier.

These objects and or others are obtained by an air purifier, and a filter cleaner as set out in the appended claims.

As has been realized by the inventor, existing air-purifiers are associated with problems relating to keeping the filter of the air-purifier clean. As a result, filters typically need to be exchanged or at least be removed for cleaning the filter. Also, automatic cleaning mechanisms are not very efficient.

Therefore, in accordance with the present invention, an air purifier and filter cleaner are provided that can provide a cleaning of the filter without a need to remove the filter. The filter cleaning can be made automatic and cleaned particles can be collected in a safe manner.

In accordance with a first aspect of the invention a filter cleaner is provided. The filter cleaner is configured to be mounted in an air purifier. The filter cleaner comprises a motor, a cleaning member and a gear mechanism. The motor is configured to via the gear mechanism drive a radially outwards facing surface of a cylindrical air filter or a filter holding case past the cleaning member. Hereby it is achieved that the filter of the air-purifier can be cleaned without having to remove the filter for cleaning or replacement and at the same time an efficient cleaning of the filter is achieved. In particular the entire surface of the filter can be cleaned.

In accordance with some embodiments the cleaning member is located in a cleaning module. Hereby all parts used for cleaning the filter can be located in a single module that is easy to assemble or replace.

In accordance with one embodiment, the filter cleaner further comprises at least one UV light source such as a UV lamp. Hereby the cleaning can be improved by the use of UV light that can eliminate microorganisms and the like. The at least one UV light source can in some embodiments be located in the cleaning module.

In accordance with one embodiment, the cleaning member is configured to, when in use, extend in a vertical direction. Hereby it is achieved that any material scraped off the filter will fall downwards to a single collection location.

In accordance with one embodiment, the filter cleaner is provided with a dust collection box that can be located beneath the cleaning member for holding any dust or material scraped off the filter for easy removal from the filter cleaner.

In accordance with one embodiment, the filter cleaner further comprises an indicator configured to signal when it is time to empty the dust collection box. Hereby, the collection of dust and material from the dust collection box is facilitated in that a user can be made aware when it is time to empty the dust collection box.

In accordance with one embodiment, the gear mechanism is located at a bottom section of the filter cleaner when the filter cleaner is in use. Hereby a stable and compact implementation of a tower air purifier can be achieved.

In accordance with one embodiment the cleaning member comprises a brush, a lamella or a protruding member. Hereby an efficient cleaning member can be implemented.

In accordance with a second aspect of the invention an air purifier comprising a polygonal casing and a cylindrical air filter with a radially outwards facing surface is provided. The cylindrical air filter can be located inside the polygonal casing so that a space is formed between the radially outwards facing surface of the cylindrical air filter and the inside corners of the polygonal casing. Hereby an air purifier that has a compact design can be implemented the space formed between the cylindrical filter and the polygonal casing can be used to house additional components of the air purifier.

In accordance with one embodiment, a filter cleaner is, at least partly, located in the space between the radially outwards facing surface of the cylindrical air filter and the inside corners of the polygonal casing. Hereby a filter cleaner can be provided without adding to the space requirements and at the same time provide an efficient cleaning mechanism for the air-purifier. The filter cleaner can in accordance with some embodiments be a filter cleaner as set out above.

BRIEF DESCRIPTION OF THE DRAWINGS

The invention will now be described in more detail, by way of example, and with reference to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those skilled in the art. For example, like or similar components of different embodiments can be exchanged between different embodiments. For example, the filter unit as described herein is shown in a tower type air-purifier, but the filter unit could equally be mounted on any type of air purifier. Some components can be omitted from different embodiments. Like numbers refer to like elements throughout the description.

As has been realized existing air purifiers suffer from the drawback that the filter of the air purifier needs to be removed for efficient cleaning or replacement. To address this problem an air-purifier and a filter cleaner that can provide efficient cleaning of the air filter of the air-purifier without a need to remove the filter has been conceived.

The filter cleaner comprises a cleaning member that is configured to clean a rotating cylindrical filter located inside the air-purifier. This allows the entire filter surface to be efficiently cleaned without a need for removing the filter for cleaning.

Figure 1:
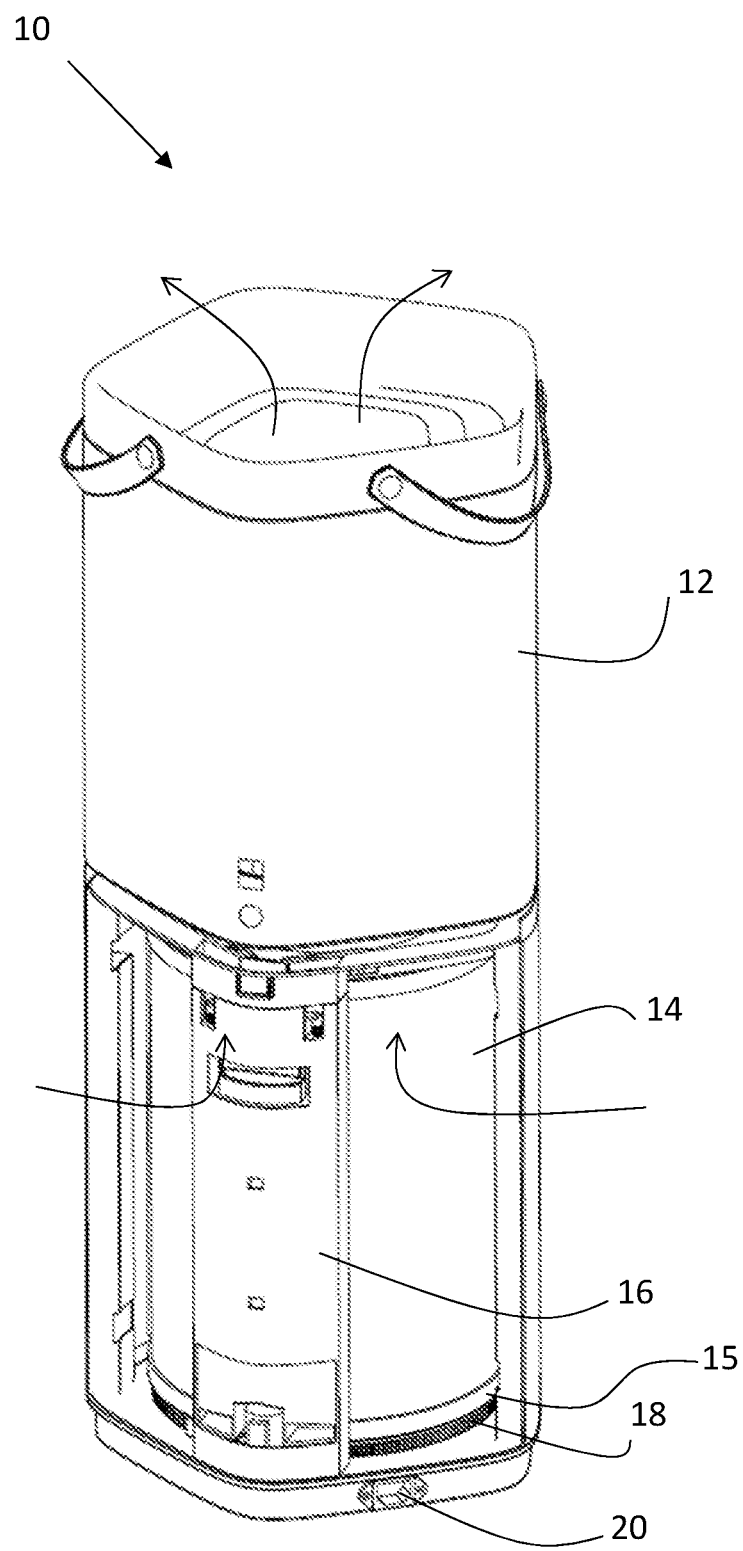
FIG. 1 is a view in perspective of an air purifier.

In FIG. 1 an air purifier 10 is depicted. In the exemplary embodiment shown in FIG. 1, the air-purifier 10 is of a tower type, i.e. a standing air-purifier having a bottom section configured to stand on a floor. A tower type of air-purifier is typically also elongated in an upwards direction when in use. However, the invention is not limited to such a type of air purifier. In an air-purifier of tower type air can be drawn into the air-purifier from the sides of the air-purifier by a fan. The air is made to pass an air-filter inside the air-purifier and the air the exits the air-purifier at the top of the air-purifier. In FIG. 1 the air-flow is generally indicated by the arrows.

The air-purifier 10 has a casing 12. The casing 12 has a polygonal cross section as seen from the top of the air-purifier. The polygonal shape can be a regular polygonal shape. In particular the polygon can have at least five sides. The casing 12 shown in FIG. 1 is shaped as a regular polygon with five sides. Inside the casing a cylindrical filter 14 is provided. The cylindrical filter 14 can rotate inside the casing. In particular the cylindrical filter 14 can be made to rotate passed a filter cleaner. The cylindrical filter 14 can be placed in a filter holding case 15. At least parts of the filter cleaner are here provided in a filter cleaner module 16. However, it is also envisaged that one or more parts of the filter cleaner is/are located outside the filter cleaner module 16. To drive the cylindrical filter a motor can be provided that via a gearing mechanism rotates the filter passed the filter cleaner module 16. To engage the gearing mechanism the cylindrical filter can be provided with teeth 18. The teeth 18 can engage a gear mechanism driven by a motor as is described below. The filter cleaner module 16 can be located in a space formed between the outwards facing surface of the cylindrical filter and a corner of the polygonal casing. This is better shown in FIG. 2. To supply power to the air-purifier a power connection 20 is provided.

Figure 2:
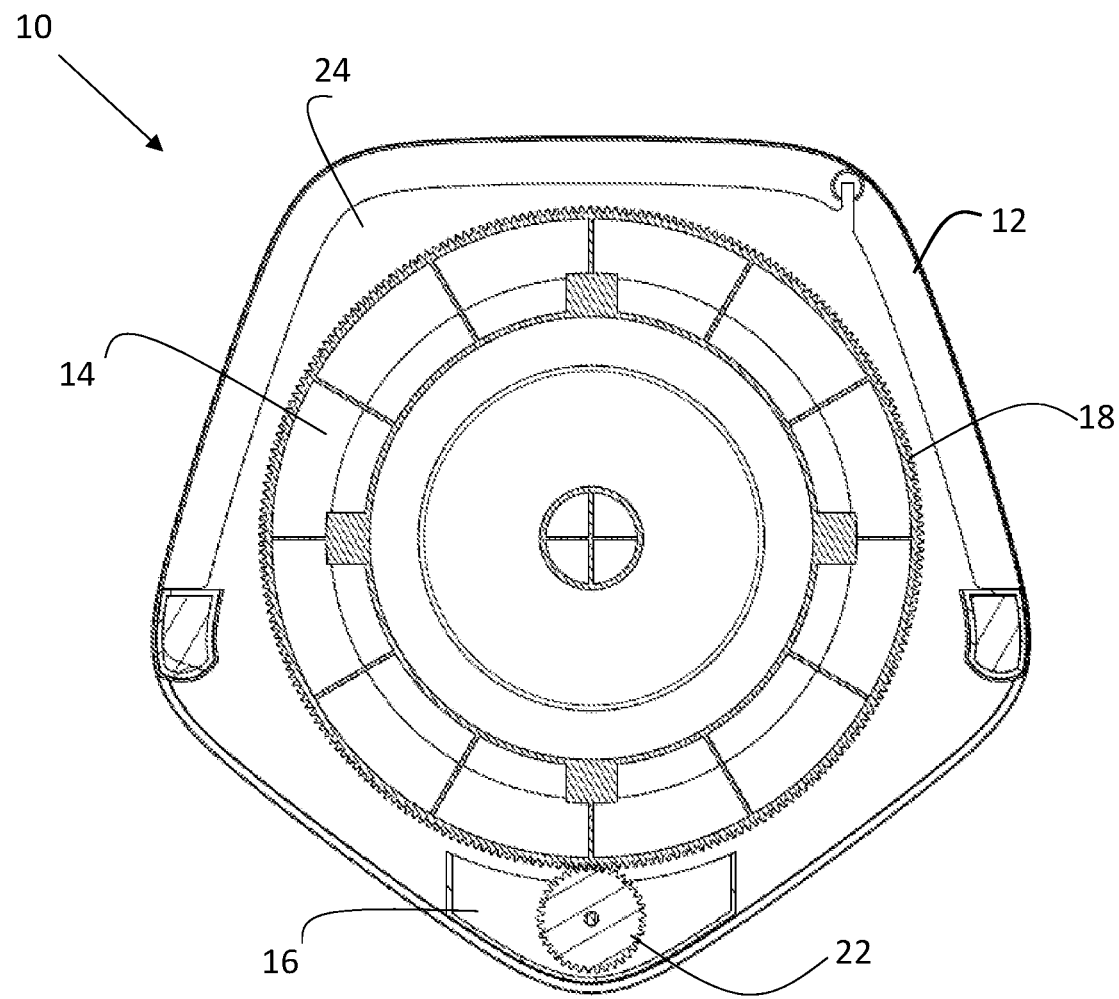
FIG. 2 is a top sectional view of an air purifier.

In FIG. 2, a top sectional view of the air-purifier 10 is shown. As can be seen in FIG. 2, there is a space 24 formed between the outer surface of the air-filter 14 and the polygonal casing 12 at the corners of the polygonal casing. At least one of such spaces 24 can be used to house various components of the air-purifier on a compact manner. In FIG. 2 a filter cleaner module 16 is provided in such a space. The filter cleaner can be provided in many different forms. In the embodiments shown herein, the filter cleaner is provided in a filter cleaner module housing many different components. This is advantageous for facilitating assembly and also for replacement. However, it is also envisaged that different components can be provided without being located in a filter cleaning module.

Figure 3:
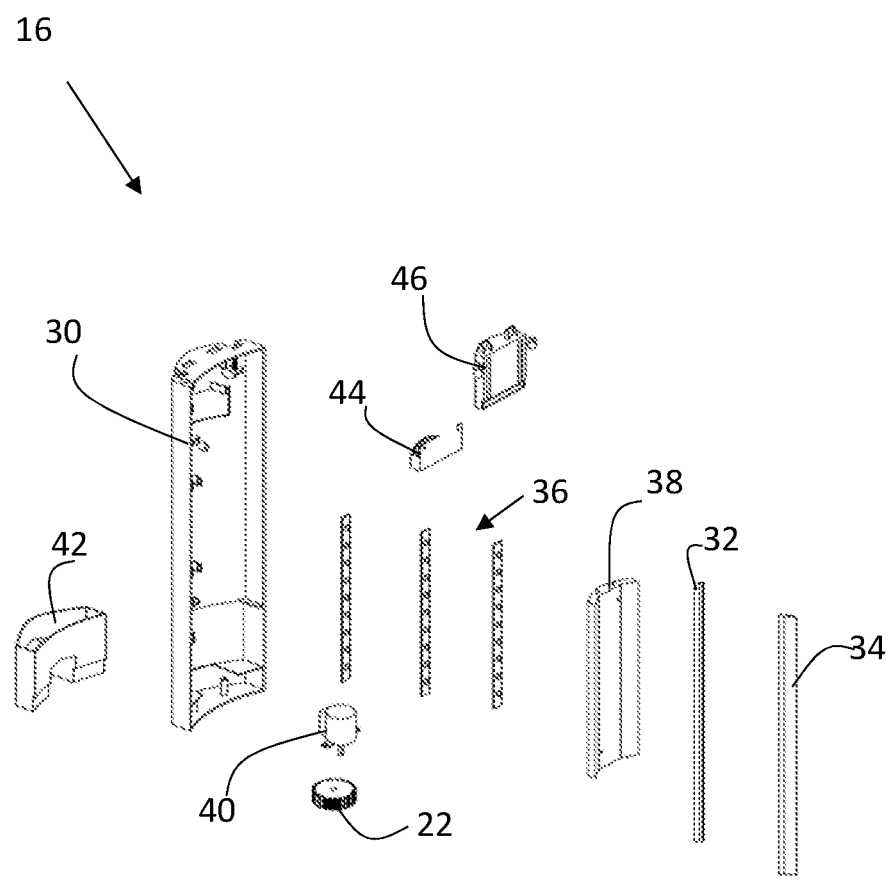
FIG. 3 is an exploded view of a filter cleaner for an air purifier.

In FIG. 3, an exploded view of a filter cleaning module 16 is shown. As stated above some or all of the components can be provided separately and need not be part of the filter cleaning module 16, such a filter cleaner housed in a module is shown in an exploded view.

The filter cleaning module 16 has a housing 30. Inside the housing 30 a number of components can be located. In the exemplary embodiment shown in FIG. 3, cleaning members formed by a lamella 32 to scrape dust from an air-filter to be cleaned and a brush 34 are provided. Other types of cleaning members could also be envisaged in other embodiments such as any type of protruding structure adapted to contact a filter passing the cleaning member to remove dust and other particles from the filter.

Also, a UV light source such as at least one UV lamp 36 can be provided in the filter cleaning module 16 to clean the rotating filter from microorganisms such as bacteria and the like by killing it with the UV light. The UV light can be made to pass a lens 38 to make the light more efficient for eliminating microorganisms. To rotate the filter in the air purifier, a motor 40 can be provided together with a gear mechanism 22. When the motor 40 is run, the air-filter can be made to rotate via the gear mechanism 22 being in connection with the air-filter, for example via teeth provided on the air filter. Further, a dust collection box 42 can be provided in the filter cleaning module. In accordance with one embodiment, the cleaning module is oriented in a generally vertical position with the dust collection box 42 located at the bottom section. Thus, the cleaning members will then also be in a vertical position so that any material removed from the air filter will fall downwards. Any material removed from the filter will then be collected in the dust collection box 42 located below the cleaning members 32, 34. The components of the filter cleaning module 16 can be held in place by locking members 44, 46.

The filter cleaning module can be accessed via a door in the casing of the air-purifier. Further, for easy access of the dust collection box 42, the dust collection box can be removed backwards, radially outwards from the filter cleaning module. In this manner the dust collection box 42 can be easily pulled out from the filter cleaning module and emptied. To further facilitate emptying of the dust collection box, an indicator can be provided to indicate, for example, by a visual indication (not shown) that it is time to empty the dust collection box 42. The dust collection box 42 can be designed with a hollow mid-section for easy pulling with a finger. Also, the bottom surface of the dust collection box can have a sloping surface to collect the dust better.

The invention claimed is:

1. A filter cleaner configured to be mounted in an air purifier, the filter cleaner comprising:
   a motor;
   a cleaning member located in a filter cleaning module;
   at least one UV light source located in the filter cleaning module; and
   a gear mechanism;
   wherein the motor is configured to drive the gear mechanism to thereby drive a radially outwards facing surface of a cylindrical air filter or a filter holding case past the cleaning member.

2. The filter cleaner according to claim 1, wherein the cleaning member is configured to, when in use, extend in a vertical direction.

3. The filter cleaner according to claim 1, further comprising a dust collection box.

4. The filter cleaner according to claim 3, wherein the dust collection box is located beneath the cleaning member when the filter cleaner is in use.

5. The filter cleaner according to claim 3, further comprising an indicator configured to signal when it is time to empty the dust collection box.

6. The filter cleaner according to claim 1, wherein the gear mechanism is located at a bottom section of the filter cleaner when the filter cleaner is in use.

7. The filter cleaner according to claim 1, wherein the cleaning member comprises a brush, a lamella or a protruding member.

8. An air purifier comprising:
a polygonal casing,
a cylindrical air filter with a radially outwards facing surface,
wherein the cylindrical air filter is located inside the polygonal casing so that a space is formed between the radially outwards facing surface of the cylindrical air filter and the inside corners of the polygonal casing
a filter cleaner is at least partly located in the space between the radially outwards facing surface of the cylindrical air filter and an inside corner of the polygonal casing, the filter cleaning comprising:
a cleaning member,
a gear mechanism,
a motor configured to drive the gear mechanism to thereby drive the radially outwards facing surface of a cylindrical air filter past the cleaning member, and
a filter cleaner housing encasing the motor, the cleaning member and the gear mechanism.

9. The air purifier according to claim 8, wherein:
the inside corner comprises a corner defined between two adjacent straight walls of the polygonal casing;
the corner is spaced further from the radially outwards facing surface of the cylindrical air filter than the two adjacent straight walls of the polygonal casing; and
the filter cleaner housing is tapered from the corner to the two adjacent straight wall of the polygonal casing to fit within the space.

10. The air purifier according to claim 8, wherein the cleaning member is configured to, when in use, extend in a vertical direction.

11. The air purifier according to claim 8, further comprising a dust collection box.

12. The air purifier according to claim 11, wherein the dust collection box is located beneath the cleaning member when the filter cleaner is in use.

13. The air purifier according to claim 11, further comprising an indicator configured to signal when it is time to empty the dust collection box.

14. The air purifier according to claim 8, wherein the gear mechanism is located at a bottom section of the filter cleaner when the filter cleaner is in use.

15. The air purifier according to claim 8, wherein the cleaning member comprises a brush, a lamella or a protruding member.

* * * * *